(12) United States Patent
Shu

(10) Patent No.: US 7,596,551 B2
(45) Date of Patent: Sep. 29, 2009

(54) METHOD OF IMPLEMENTING B++ TREE SEARCH ON A PARALLEL USING VIRTUAL TREE STRUCTURE

(75) Inventor: Wen-Lung Shu, Chungli (TW)

(73) Assignee: Chung Hua University, Hsinchu (TW)

( * ) Notice: Subject to any disclaimer, the term of this patent is extended or adjusted under 35 U.S.C. 154(b) by 115 days.

(21) Appl. No.: 11/416,229

(22) Filed: May 3, 2006

(65) Prior Publication Data
US 2007/0214117 A1   Sep. 13, 2007

(30) Foreign Application Priority Data
Mar. 10, 2006   (TW) ............... 95108044 A

(51) Int. Cl.
*G06F 17/30* (2006.01)
(52) U.S. Cl. .................... 707/3; 707/100
(58) Field of Classification Search ........ 707/100, 707/3
See application file for complete search history.

(56) References Cited

U.S. PATENT DOCUMENTS

| | | | | | |
|---|---|---|---|---|---|
| 5,537,593 | A | * | 7/1996 | Diamond et al. ............ 719/313 |
| 5,590,063 | A | * | 12/1996 | Golio et al. ................. 702/64 |
| 5,652,581 | A | * | 7/1997 | Furlan et al. ............... 341/51 |
| 5,768,594 | A | * | 6/1998 | Blelloch et al. ............ 717/149 |
| 6,138,123 | A | * | 10/2000 | Rathbun ..................... 707/201 |
| 6,434,590 | B1 | * | 8/2002 | Blelloch et al. ............ 718/102 |
| 6,437,796 | B2 | * | 8/2002 | Sowizral et al. ........... 345/622 |
| 6,516,319 | B1 | * | 2/2003 | Benayoun et al. .......... 707/100 |
| 6,629,099 | B2 | * | 9/2003 | Cheng ......................... 707/10 |
| 6,741,983 | B1 | * | 5/2004 | Birdwell et al. ............. 707/5 |
| 6,931,401 | B2 | * | 8/2005 | Gibson et al. ................ 707/6 |
| 7,272,612 | B2 | * | 9/2007 | Birdwell et al. ............ 707/101 |
| 7,454,411 | B2 | * | 11/2008 | Birdwell et al. ............. 707/3 |
| 2004/0186920 | A1 | * | 9/2004 | Birdwell et al. ............. 710/1 |
| 2005/0251390 | A1 | * | 11/2005 | Catchpole ................... 704/242 |
| 2007/0169046 | A1 | * | 7/2007 | Gordy et al. ............... 717/151 |

OTHER PUBLICATIONS

Philippe De Smedt, Stefano Ceri, Marie-Anne Neimat, Ming-chien Shan, Rafi Ahmed, "Recursive Functions in Iris", Hewlett-Packard Laboratories, 1993 IEEE, pp. 145-154.*

* cited by examiner

*Primary Examiner*—Don Wong
*Assistant Examiner*—Thanh-Ha Dang
(74) *Attorney, Agent, or Firm*—WPAT, P.C.; Justin I. King

(57) ABSTRACT

The present invention relates to a method of implementing B++ tree search on parallel for virtual tree searcher, in which there is no need to construct and maintain tree structure. In each search step, all processor units (PUs) can be involved to complete search operation. Such kind of searcher can be implemented on hardware with low developing and production cost.

6 Claims, 4 Drawing Sheets

| p1 | p2 | p3 | p4 | p5 |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
| 41 | 42 | 43 | 44 | 45 |
| 46 | 47 | 48 | 49 | 50 |
| 51 | 52 | 53 | 54 | 55 |
| 56 | 57 | 58 | 59 | 60 |
| 61 | 62 | 63 | 64 | |

FIG. 1

METHOD OF IMPLEMENTING B++ TREE SEARCH ON A PARALLEL USING VIRTUAL TREE STRUCTURE

BACKGROUND OF THE INVENTION (a). Field of the Invention

The present invention relates to a method of implementing B++ tree search on parallel using virtual tree structure. This method can process virtual B++ tree structure search on parallel environment. All Processor Units (PUs) can be fully involved in each step to complete the search operation.

(b). Description of the Prior Arts

Since earlier computer developing stage, many researchers had been devoted to study different search methods. Today, these methods are quite mutual. Some researchers proposed several parallel search methods. But their results are dissatisfactory. Because, it is difficult to allow all PUs involving on searching distributed data in each search step. The complexity of constructing and maintaining tree structure on parallel environment is large. The production cost for this type of hardware searcher is too high.

In 1980's, Japanese proposed the concept of intelligent computers called fifth generation computers, since they posses the superior robotic technology. Japanese government integrated the enterprises and academic forces to promote this project. PROLOG will be utilized as major language in this project. This project is failed because the relative technology is not mutual enough. But the concept of fifth generation computers has been widely accepted. The inventor of this patent had explored object relational database machine in long time, and intended to adopt this machine for next generation computers. Hence solving the bottleneck of fifth generation computers is one of major purposes of this invention.

Presently the personal computer technology has rapid development. Double core CPU becomes popular in the market. It is apparent that parallel and distributed computer architecture becomes the developing trend of computer technology. Tree structure searching methods are widely adopted in the field of database systems. There is a strong need of extra large search capability over extra large data volume in the fields of database, web and artificial intelligence. To response such demand, the inventor proposes this virtual tree search method, which can execute virtual B++ tree search in the parallel environment.

SUMMARY OF THE INVENTION

The main object of the present invention is to provide a parallel virtual tree search method which performs B++ tree search using virtual tree structure. The whole search method can be implemented as software or hardware system. Because of no need to construct tree structure, hardware system can be easily developed. This hardware device can be implemented in the FPGA chips. The developing and production cost can be greatly reduced.

The second object of this invention is to provide two best search embodiments employing a parallel virtual tree search method presented in the invention. One of these search devices can be designed into a interface card which can be connected with a personal computer. Another device can be designed into several interface cards which are distributed to a multiple processor system.

BRIEF DESCRIPTION OF THE DRAWINGS

FIG. 1 is the example of parallel data distributed to 5 PUs.

DETAILED DESCRIPTION OF THE INVENTION

In order to let esteemed examiners further recognize and understand the characteristics, objects, and functions of the invention, preferable embodiments cooperating with corresponding drawings are presented in detail thereinafter.

The present invention can be described briefly as the following three aspects:

1. The parallel virtual tree search method according to the present invention can be implemented as a software system, and implemented in a multiple processor system. It can also be implemented as hardware searcher, and such searcher can be designed with Rotate Left/Right capability to perform insert and delete operations.

2. There are m processor units in the system according to the present invention. In each search loop, one PU must in rest state. When m is increasing, the overall performance is only slightly reduced. But, every PU only process data in the corresponding memory unit. Communication cost, maintaining tree cost and extra memory cost can be completely eliminated.

3. This present invention uses virtual tree structure. Every PU can use equation to calculate PATH. PU is in rest state if PATH=0, and PATH is the path number of PU if $1 \leq PATH \leq m-1$. PU also calculates the location where the data needs to retrieve for comparison. Such processing method can be implemented in hardware in FPGA chips with low production cost, faster speed and better reliability.

The B++ tree search method used in the present invention is in parallelized manner and can be hardware implemented with low production cost. The detailed description of the present invention is illustrated as below:

1. Assume that N represents the data size and m represents total processor number. N data is ordered according to search key values and is distributed to m memory units which are corresponding to every PU. N is 64 and m is 5 in the example shown in the FIG. 1. It is noted that each Location k (where k is between 1 and 64) contains a search key value and k is merely sequence ordered number. $P_i$ is the i-th processor unit where i is between 1 and m. Therefore, the relationship among k, m and i is found: k MOD m=i. In other words, if we want to know the search key value of location k, then this value can be found in the memory of processor unit $P_i$.

Figure 2:
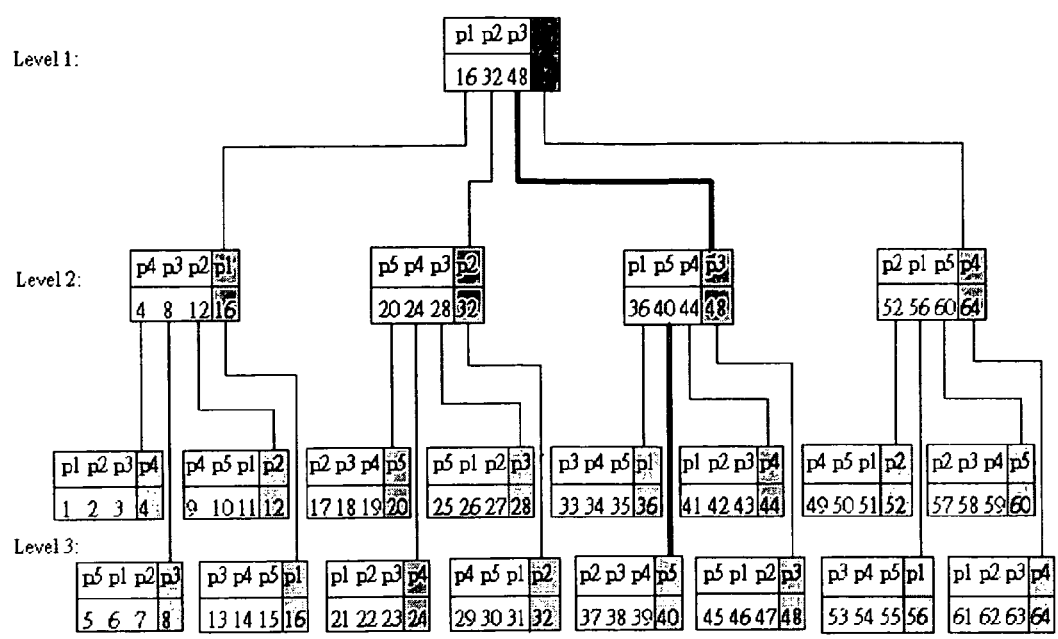
FIG. 2 is the virtual B++ tree structure for the example in FIG. 1.

2. The search key values of data can be sorted and distributed to m PUs. At initial, host sends BlockSize=64, UpperBound=64, m=5, height=$\lceil \log_{m-1} N \rceil$=3 and Prepath=4 to all processors. This search example can be completed in 3 loops with 3 comparisons in worst case. If search value is found earlier by a processor, this processor will broadcast stop signal to all processor. Assume the search criterion can be found at Location=38. The proposed algorithm can be described in detail as below:

(2a). At loop 1, all PUs will process BlockSize=BlockSize/(m-1)=16, UpperBound=64 and UpperBound MOD m=4. Therefore, all PUs know P4 represents Prepath=4 with location=64. Since loop number is odd, processor numbers must be increasing when corresponding path numbers are increasing. Each processor can calculate his representing path and the location to retrieve data. In FIG. 2, P1~P4 represents path 1~4 and P5 must take a rest (represents path 0). P1~P4 will retrieve data at location 16, 32, 48 and 64. Finally P3 finds that the search criterion is in its range, and broadcast path=3 to Prepath values in all PUs.

(2b). At loop 2, BlockSize=4, UpperBound=48 and UpperBound MOD m=3. P3 represents PATH=4 with location=48. Since loop number is even, processor numbers must be decreasing when corresponding path numbers are increasing. Each processor can calculate its representing path and the location to retrieve data. In FIG. 2, P1, P5, P4, P3 represents path 1~4, and P2 must take a rest. P1, P5, P4, and P3 will retrieve data at location 36, 40, 44 and 64. P5 finds that the search criterion is in its range, and broadcast path=2 to Prepath values in all PUs.

(2c). At loop 3, BlockSize=1, UpperBound=40 and UpperBound MOD m=0. $P_5$ represents path=4 with location=40. Loop number is odd again. In FIG. 2, $P_2$, $P_3$, $P_4$ and $P_5$ represents path 1~4, and $P_1$ must take a rest. $P_2$, $P_3$, $P_4$ and $P_5$ will retrieve data at location 37, 38, 39, and 40. $P_3$ finds that the search criterion at location 38, and broadcast a stop signal to all processors.

3. The complete virtual tree structure of the proposed search method is showing in FIG. 2. In each loop, $P_1$ to $P_5$ can use the equations to calculate the representing path and the location of comparing data. This system can be faster and more reliable if this search method can be designed into a hardware system.

Figure 3:
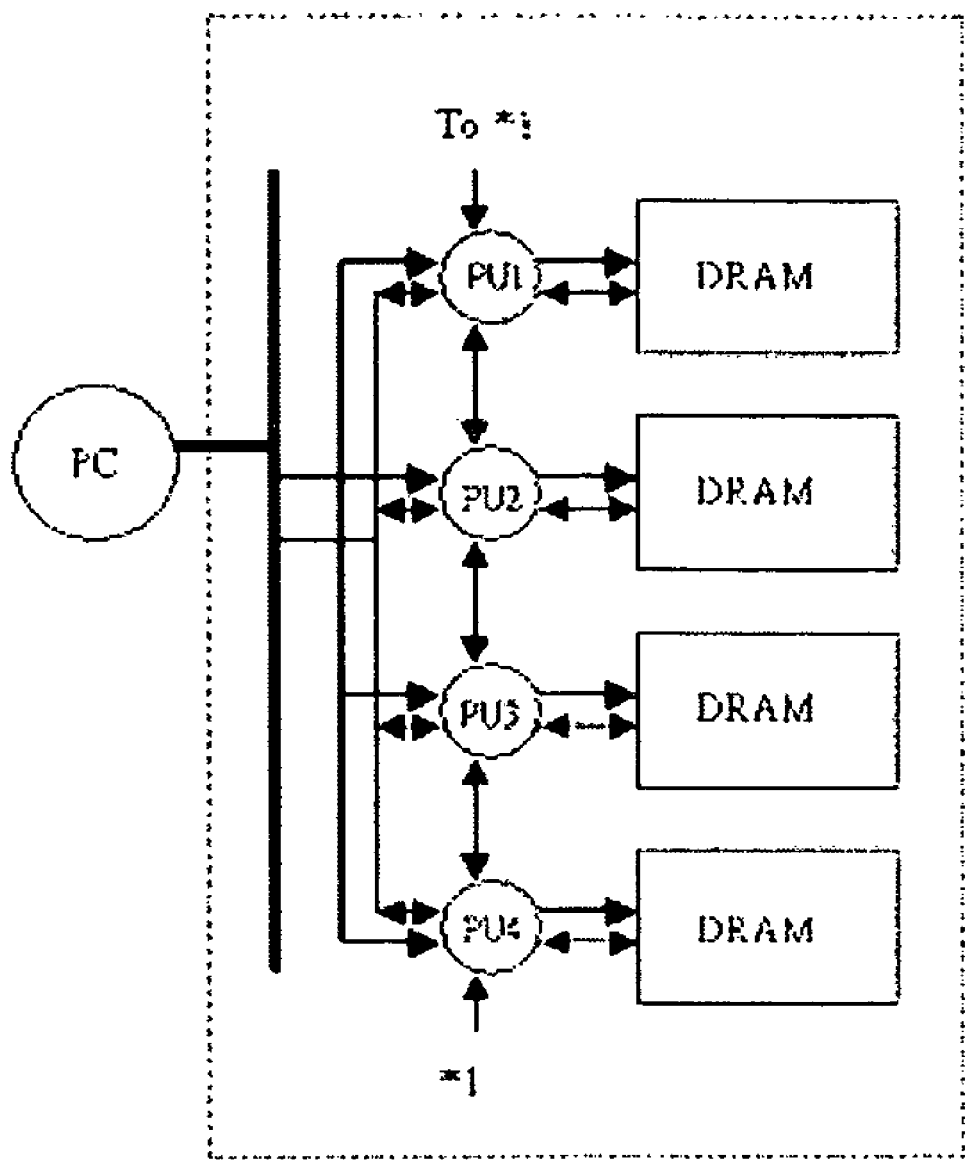
FIG. 3 is the first embodiment in which all PUs are interfaced with a personal computer.
Figure 4:
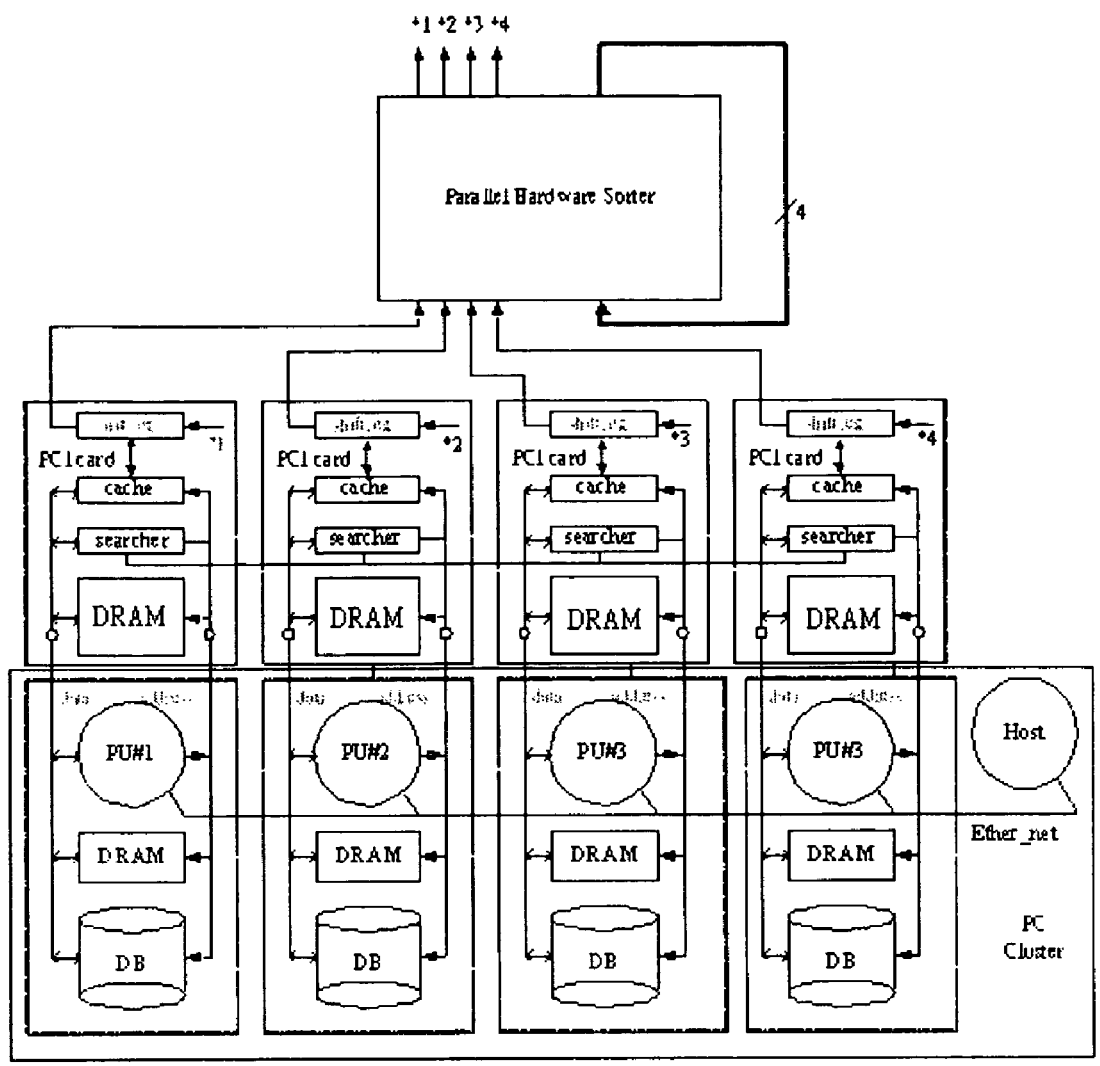
FIG. 4 is the second embodiment in which all PUs are distributed to multiple processor system.

4. Two preferred embodiments according to the present invention are illustrated in FIG. 3 and FIG. 4. These two devices can be incorporated with rotate left/right capability. In FIG. 3, all PUs are designed in a interface card. This design is suitable for personal computer. In FIG. 4, parallel search network is designed into several interface cards. These cards are distributed and implemented in multiple processor systems, such as PC Cluster, cubic system, etc.

As shown in FIG. 3, parallel searcher is designed as the interface card of personal computer. All adjacent PUs are connected as a circle which can process rotate left/right. When insert operation is implemented, search the Location I of inserting data first. Then all data from N down to I rotate right one position. Finally, insert operation can be completed by inserting data into Location I. Similar in delete operation, deleting data at Location I is found first. Then all data from I+1 to N are shift right one position.

In FIG. 4, each PU is designed into an interface card for each computer of PC cluster. The primary level processing system is including cluster computers and PUs of our searcher. The second level is a parallel hardware sorter which is used to do sorting, inserting, deleting operations.

When search is processed, one PU must be in rest state in each step. If m is increased, the system performance is increased with complexity: $\lceil \log_{m-1} N \rceil$. But, the hardware complexity is only increasing linearly. Each PU only processes data located at the corresponding memory unit. Virtual tree can be adopted and tree maintaining cost can be completely eliminated. Therefore, this searching method can be pure hardware implemented and can be designed into FPGA chips. The developing and production cost can be greatly reduced.

This present invention can provide fast search among huge data volume which is desperately needed in the deduce process of PROLOG machine. The most significance of the present invention is providing the key technique which can overcome the bottleneck of next generation intelligence computer systems. Computer can be upgraded to "Electronic Brain". All technical fields require large search capability among huge data can employ the present invention. For examples, computer network industry can use it to build their search engine, and search domain name for IP address. Object-relational database industry can use it for searching object ID. Medical and bioinformatics industry can use it for drug discovery, disease diagnosis and system biology researches.

While the present invention has been shown and described with reference to two preferred embodiments thereof, and in terms of the illustrative drawings, it should be not considered as limited thereby. Those who skilled in the art should appreciate that they can readily use the disclosed conception and specific embodiments as a basis for designing or modifying data structures for carrying out the same purpose of the present invention, and that various possible changes, substitutions and alterations can be made herein without departing from the spirit and scope of the invention as defined by the appended claims.

What is claimed is:

1. A virtual tree parallel searching method for searching a target data within N data wherein N data is distributed and ordered, said method comprising the steps of:
    employing m processor units, wherein each of said m processor units has a corresponding memory unit;
    employing a virtual tree structure in a parallel data search;
    instructing one processor unit of said m processor units in a rest state;
    activating m−1 processor units of said m processor units in $\lceil \log_{m-1} N \rceil$ searching loops, wherein each of said m−1 processor units only processes data in its corresponding memory unit, wherein m is a total number of processor units and N is a total data number;
    performing the parallel data search in said $\lceil \log_{m-1} N \rceil$ searching loops, wherein each loop further comprises:
        (a) each of said m processor units knowing a size value of a search range in each of said $\lceil \log_{m-1} N \rceil$ searching loops, and a corresponding location within said N data;
        (b) dividing the size value of the search range by m−1; and partitioning the target data within the search range into m−1 equivalent data parts;
        (c) assigning each of said m−1 equivalent data parts to each of said m−1 processor units, and said one processor unit is in said rest state;
        (d) each of said m−1 processor units determines whether said target data is found, wherein a first signal is generated to terminate said parallel data search when any of said m−1 processor units finds an exact location of said target data, and wherein a second signal is generated to notify each of the m processor units when one of said m−1 processor units finds said target data located within the assigned m−1 equivalent data parts and
        (e) continuing said $\lceil \log_{m-1} N \rceil$ next searching loop if said parallel data search is not terminated.

2. The virtual tree parallel searching method of claim 1, wherein in said step (a), the corresponding location within the complete data is derived from the following equation:

UpperBound=UpperBound−BlockSize*(m−1−PrePath);

wherein BlockSize is total data searching range in the loop, UpperBound is location of a maximum value of the BlockSize, PrePath is a previous PATH value in a previous loop, wherein at initialization: BlockSize=N, UpperBound=N, and PrePath=m−1.

3. The virtual tree parallel searching method of claim 1, wherein said step (b) further comprising:
    dividing the search range in the loop (BlockSize) into m−1 equivalent data parts, as the following equation:
    BlockSize=BlockSize/(m−1), wherein the BlockSize becomes the m−1 equivalent data search range of the data parts assigned to each of the m processor units.

4. The virtual tree parallel searching method of claim 1, wherein said step (c), further comprising the following two steps:

(f) identifying the location of the maximum value in the loop as UpperBound, from equation j=UpperBound MOD m, the UpperBound is located in memory unit of $p_j$ processor unit, and a PATH value of $p_j$ must be m−1; and (g) if the loop number is odd, then increasing a sequence of processor units and increasing the PATH value, otherwise, if the loop number is even, then decreasing the sequence of processor units and increasing the PATH value, wherein the PATH value that represents for each processor unit $p_i$ where 1≦i≦m−1 is calculated as following:

PATH=i+m−j−1 if loop number is odd and $i \leq j$;

PATH=i−j−1 if loop number is odd and $i > j$;

PATH=m+j−i−1 if loop number is even and $i < j$;

PATH=j−i−1 if loop number is even and $i < j$;

if the PATH value is 0, then $p_i$ is in the rest state, otherwise, the PATH value of $p_i$ is between 1 and m−1.

5. The virtual tree parallel searching method of claim 1, wherein said step (d), further determining whether the target data is in a Location, wherein:

Location=UpperBound−BlockSize*(*m−PATH*−1), if $p_i$ detects the target data is in its assigned equivalent data parts, then the PATH value is passed to all processor units, the PrePath of all processor units are changed to the passed PATH value.

6. The virtual tree parallel searching method of claim 1, said method is implemented as software and is processed in a multiple processors system.

\* \* \* \* \*